(12) United States Patent
Delp

(10) Patent No.: US 10,047,656 B2
(45) Date of Patent: Aug. 14, 2018

(54) METHOD AND APPARATUS FOR OPERATING A COMBUSTION MACHINE

(71) Applicant: Continental Automotive GmbH, Hannover (DE)

(72) Inventor: Matthias Delp, Bad Abbach (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 64 days.

(21) Appl. No.: 15/222,423

(22) Filed: Jul. 28, 2016

(65) Prior Publication Data
US 2017/0030237 A1 Feb. 2, 2017

(30) Foreign Application Priority Data

Jul. 31, 2015 (DE) .................. 10 2015 214 702

(51) Int. Cl.
*F01N 3/00* (2006.01)
*F01N 3/22* (2006.01)
(Continued)

(52) U.S. Cl.
CPC ............ *F01N 3/22* (2013.01); *F01N 9/005* (2013.01); *F01N 11/002* (2013.01);
(Continued)

(58) Field of Classification Search
USPC ......... 60/274, 276, 277, 285, 286, 297, 301, 60/278; 123/90.15, 90.16, 90.17, 90.18,
(Continued)

(56) References Cited

U.S. PATENT DOCUMENTS 6,240,723 B1 * 6/2001 Ito ........................... F02B 3/06
123/568.21
6,266,957 B1 * 7/2001 Nozawa .................... F01L 1/34
60/284

(Continued)

FOREIGN PATENT DOCUMENTS

AT 501678 A2 10/2006 ............... F01L 1/34
EP 2562398 A1 2/2013 ............ F02D 13/02

OTHER PUBLICATIONS

German Office Action, Application No. 102015214702.9, 4 pages, dated Mar. 16, 2016.

*Primary Examiner* — Binh Q Tran
(74) *Attorney, Agent, or Firm* — Slayden Grubert Beard PLLC

(57) ABSTRACT

The disclosure relates to internal combustion engines in general, and teaches various methods and apparatus for operating engines with an exhaust-gas turbocharger. Some embodiments include a method for operating an internal combustion engine having a fresh-gas tract for the supply of fresh gas to a cylinder, and an exhaust tract for the discharge of exhaust gas. They may include determining a value of a first operating condition of a catalytic converter arranged in the exhaust tract; determining a value of a second operating condition of the catalytic converter; calculating, as a function of the determined value, a first value for a maximum admissible scavenged-over quantity of fresh gas into the exhaust tract during scavenging operation; and setting the maximum admissible scavenged-over quantity to a second value lower than the first value if the value of the second operating condition reaches a predefined value.

15 Claims, 1 Drawing Sheet

(51) Int. Cl.
- *F01N 9/00* (2006.01)
- *F02D 41/00* (2006.01)
- *F02D 41/02* (2006.01)
- *F01N 11/00* (2006.01)
- *F02D 13/02* (2006.01)
- *F02B 25/14* (2006.01)
- *F02D 23/00* (2006.01)

(52) U.S. Cl.
CPC ........ *F02B 25/145* (2013.01); *F02D 13/0261* (2013.01); *F02D 23/00* (2013.01); *F02D 41/0002* (2013.01); *F02D 41/0235* (2013.01); *F02D 41/0295* (2013.01); *F01N 2550/02* (2013.01); *F01N 2900/0416* (2013.01); *F01N 2900/1602* (2013.01); *F01N 2900/1618* (2013.01); *F02D 41/0007* (2013.01); *F02D 2041/001* (2013.01); *F02D 2200/0802* (2013.01); *F02D 2200/0804* (2013.01); *F02D 2200/0816* (2013.01); *F02D 2250/36* (2013.01); *Y02T 10/144* (2013.01); *Y02T 10/18* (2013.01); *Y02T 10/42* (2013.01); *Y02T 10/47* (2013.01)

(58) Field of Classification Search
USPC .......................................... 123/295, 305, 698
See application file for complete search history.

(56) References Cited

U.S. PATENT DOCUMENTS

| | | | |
|---|---|---|---|
| 6,561,147 B2* | 5/2003 | Takahashi | F01L 1/3442 123/90.15 |
| 6,739,295 B1* | 5/2004 | Yamaoka | F02B 1/12 123/406.41 |
| 6,898,927 B2* | 5/2005 | Morinaga | F01N 3/2006 123/688 |
| 2011/0209685 A1* | 9/2011 | Shane | F02D 41/0002 123/299 |
| 2013/0305713 A1* | 11/2013 | Tsuyuki | F02D 23/02 60/602 |

* cited by examiner

METHOD AND APPARATUS FOR OPERATING A COMBUSTION MACHINE

CROSS-REFERENCE TO RELATED APPLICATIONS

This application claims priority to DE Application No. 10 2015 214 702.9 filed Jul. 31, 2015, the contents of which are hereby incorporated by reference in their entirety.

TECHNICAL FIELD

The disclosure relates to internal combustion engines in general, and teaches various methods and apparatus for operating engines with an exhaust-gas turbocharger.

BACKGROUND

Combustion machines having an internal combustion engine may include an exhaust-gas turbocharger. An associated operating mode is so-called scavenging. In this case, an inlet valve and an outlet valve of the combustion machine are actuated such that the opening times partially overlap. As a result, a part of the drawn-in fresh gas passes through the cylinder into the exhaust tract (it is scavenged). Said fresh gas in the exhaust tract increases the mass flow for the operation of the turbocharger.

It is desirable to specify a method for operating a combustion machine, which method permits reliable operation even during scavenging operation. It is also desirable to specify an apparatus which is designed to carry out the method.

SUMMARY

In some embodiments, a method for operating a combustion machine (100) having an internal combustion engine (101), having a fresh-gas tract (102) for the supply of fresh gas (103) to a cylinder (104), and having an exhaust tract (105) for the discharge of exhaust gas (106), may include: determining a value of a state of a catalytic converter (114) which is arranged in the exhaust tract (105), determining, as a function of the determined value, a first value for a maximum admissible scavenged-over quantity of fresh gas (103) into the exhaust tract (105) during scavenging operation, setting the maximum admissible scavenged-over quantity to a second value which is lower than the first value if a predefined value of a further state of the catalytic converter (114) has been determined.

In some embodiments, the determination of the value of the state of the catalytic converter (114) comprises modeling the value of the state.

In some embodiments, the determination of the value of the state of the catalytic converter (114) comprises at least one of the following: determining a value of a temperature gradient of the catalytic converter (114), determining a value of an absolute temperature of the catalytic converter (114), determining a value of a quantity of hydrocarbons in the catalytic converter (114), determining a value of an oxygen storage capacity of the catalytic converter (114), and determining an operating age of the catalytic converter (114).

In some embodiments, the determination of the predefined value of the further state of the catalytic converter (114) comprises at least one of the following: comparing an actual value of a temperature gradient of the catalytic converter (114) with a predefined value for the temperature gradient, comparing an actual value of an absolute temperature of the catalytic converter (114) with a predefined value for the absolute temperature, comparing an actual value of a quantity of hydrocarbons in the catalytic converter (114) with a predefined value for the quantity of hydrocarbons, comparing an actual value of an oxygen storage capacity of the catalytic converter (114) with a predefined value for oxygen storage capacity, and comparing an actual value of an operating age of the catalytic converter (114) with a predefined value for the operating age.

In some embodiments, an inlet valve (107) for controlling the supply of the fresh gas (103) is arranged in the fresh-gas tract (102), and an outlet valve (108) for controlling the discharge of the exhaust gas (106) is arranged in the exhaust tract (105), comprising: determining an opening time period for the inlet valve (107), determining an opening time period for the outlet valve (108), determining an overlap period, in which the two opening time periods at least partially overlap, as a function of the maximum admissible scavenged-over quantity.

Some embodiments include regulating the scavenged-over quantity as a function of a temperature of the catalytic converter (114) if the predefined value of the further state of the catalytic converter (114) has been determined.

Some embodiments include an apparatus for operating a combustion machine (100), designed to carry out a method as described above.

BRIEF DESCRIPTION OF THE DRAWINGS

Advantages, features, and refinements will emerge from the following examples, which will be discussed in conjunction with the figures, in which.

DETAILED DESCRIPTION

Figure 1:
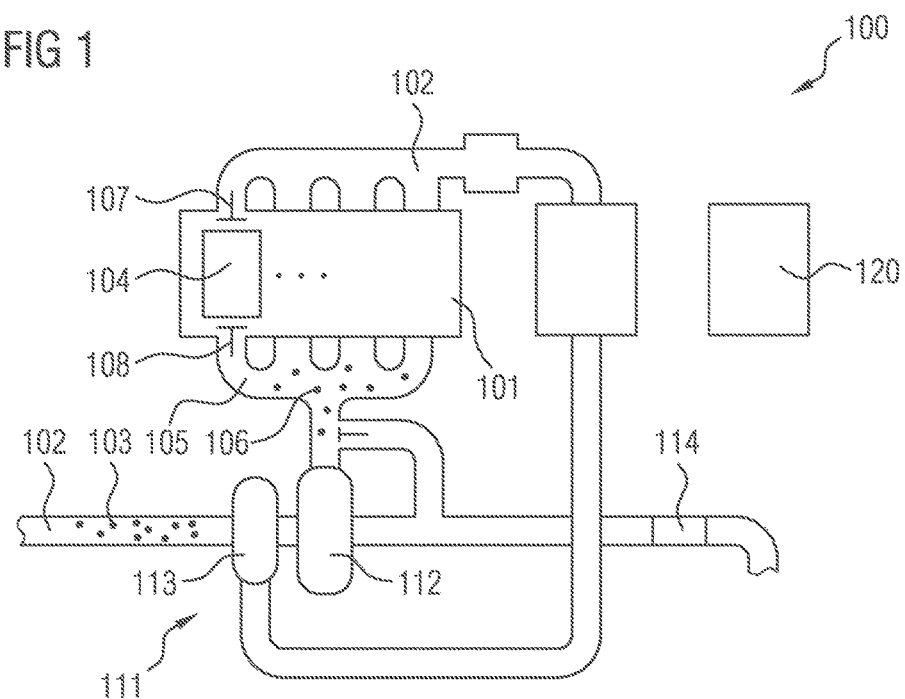
FIG. 1 is a schematic illustration of an embodiment of a combustion machine.

In some embodiments of teachings of the present disclosure, the combustion machine has an internal combustion engine, a fresh-gas tract for the supply of fresh gas to a cylinder, and an exhaust tract for the discharge of exhaust gas. A value of a state of a catalytic converter is determined. The catalytic converter is arranged in the exhaust tract. A first value for a maximum admissible scavenged-over quantity of fresh gas into the exhaust tract during scavenging operation is determined as a function of the determined value. The maximum admissible scavenged-over quantity is set to a second value which is lower than the first value if a predefined value of a further state of the catalytic converter has been determined.

The quantity of fresh gas that is scavenged from the fresh-gas tract through the cylinder into the exhaust tract during scavenging operation is determined as a function of at least a state of the catalytic converter. It is thus possible to realize a desired high mass flow in the exhaust tract and to simultaneously prevent a malfunction in the catalytic converter. The fresh gas that is scavenged through may result in a lean exhaust-gas mixture in the exhaust tract. This may lead to adverse operating conditions for the catalytic converter.

For example, a deficiency of hydrocarbons in the exhaust gas may have the effect that NOx (nitrogen oxides) can no longer be reduced as intended. The NOx emissions can thus increase. Through the determination of the value for the maximum admissible scavenged-over quantity as a function of the catalytic converter, fresh gas is conducted to the catalytic converter only in such an amount as the catalytic converter can cope with in order to realize adequate reduction of pollutants such as NOx. Here, it is possible to operate at the upper limit of the load capacity of the catalytic converter and thus permit a high enough mass flow for reliable operation.

In some embodiments, the value of the state of the catalytic convertor and/or the value of the further state are/is measured by way of one or more sensors. Alternatively or in addition, the value of the state and/or the value of the further state are/is determined by way of a predefined model. Costs can be saved in this way.

In some embodiments, the determination of the value of the state of the catalytic converter comprises at least one of the following:
  determining a value of a temperature gradient of the catalytic converter,
  determining a value of an absolute temperature of the catalytic converter,
  determining a value of a quantity of hydrocarbons in the catalytic converter,
  determining a value of an oxygen storage capacity of the catalytic converter, and
  determining an operating age of the catalytic converter.

It is thus possible for the maximum admissible scavenged-over quantity to be determined as a function of the temperature of the catalytic convertor and/or of the hydrocarbon saturation of the catalytic convertor and/or of a degree of aging of the catalytic converter. In this way, adequate pollutant reduction by the catalytic converter is possible. In exemplary embodiments, further values of further states of the catalytic converter are alternatively or additionally determined.

In some embodiments, the determination of the predefined value of the further state of the catalytic converter comprises at least one of the following:
  comparing an actual value of a temperature gradient of the catalytic converter with a predefined value for the temperature gradient,
  comparing an actual value of an absolute temperature of the catalytic converter with a predefined value for the absolute temperature,
  comparing an actual value of a quantity of hydrocarbons in the catalytic converter with a predefined value for the quantity of hydrocarbons,
  comparing an actual value of an oxygen storage capacity of the catalytic converter with a predefined value for oxygen storage capacity, and
  comparing an actual value of an operating age of the catalytic converter with a predefined value for the operating age.

The determination of the predefined value of the further state corresponds to a determination of a termination condition for the permission of the scavenged-over quantity up to the first value for the maximum admissible scavenged-over quantity. If at least one of the predefined values of at least one of the further states is determined, there is the risk of too much fresh gas being present in the exhaust tract, such that the catalytic converter can no longer adequately reduce pollutants. Thus, the maximum admissible scavenged-over quantity is set to the lower, second value, and thus the amount of fresh gas in the exhaust tract is reduced. In this way, reliable operation of the catalytic converter is made possible.

In some embodiments, an inlet valve for controlling the supply of the fresh gas is arranged in the fresh-gas tract, and an outlet valve for controlling the discharge of the exhaust gas is arranged in the exhaust tract. An opening time period for the inlet valve is determined. An opening time period for the outlet valve is determined. An overlap period is determined as a function of the maximum admissible scavenged-over quantity. In the overlap period, the two opening time periods at least partially overlap. During the overlap of the two opening time periods, fresh gas is scavenged through the cylinder into the exhaust tract. For example, the maximum admissible scavenged-over quantity is implemented in a characteristic map-based manner by way of corresponding camshaft setpoint values. The camshaft setpoint values predefine the respective opening time periods for the inlet valve and the outlet valve.

In some embodiments, the scavenged-over quantity is regulated as a function of a temperature of the catalytic converter if the predefined value of the further state of the catalytic converter has been determined. Thus, reliable operation of the catalytic converter is possible even with the second, lower value of the scavenged-over quantity.

FIG. 1 shows an embodiment of a combustion machine 100. The combustion machine 100 comprises an internal combustion engine 101 with at least one cylinder 104 and one inlet valve 107 for regulating the fresh gas 103 flowing into the cylinder 104. The fresh gas 103 flows through a fresh-gas tract 102 to the cylinder 104. The fresh gas 103 may be in particular air. After the combustion of the fuel in the cylinder 104, exhaust gas 106 passes via an exhaust tract 105 to a catalytic converter 114. The catalytic converter may be in particular designed to reduce nitrogen oxides in the exhaust gas 106.

The combustion machine furthermore has a supercharging unit 111, in particular a turbocharger, also referred to as exhaust-gas turbocharger. The turbocharger 111 has a turbine 112 and a compressor 113. The turbine 112, which is driven by the gas flow in the exhaust tract 105, drives the compressor 113. In this way, the fresh gas 103 conducted through the compressor 113 is compressed before being conducted into the cylinder 104. It is thus possible for the engine efficiency to be increased, or, for smaller swept volumes, to be kept the same.

In particular at the low-load operating point of the internal combustion engine 101, it has hitherto been the case that the exhaust-gas mass flow at the turbine 112 of the turbocharger 111 is possibly not sufficient to be able to set the demanded charge pressure for the operating point of relatively high engine load. The power of the turbocharger 111 increases only gradually in a manner dependent on the continuously rising exhaust-gas mass flow.

To increase the mass flow in the exhaust tract 105, so-called scavenging may be performed. Here, fresh gas 103 is scavenged through the cylinder 104 into the exhaust tract 105 without undergoing a combustion process. Thus, for an identical torque output, the mass flow in the exhaust tract 105 is increased. In this way, it is made possible to realize greater power at the turbine 112. During the scavenging, fresh gas 103 is scavenged via the cylinder 104 into the exhaust tract 105 during a valve overlap of the inlet valve 107 and of an outlet valve 108. Said fresh gas 103 increases the mass flow and shifts the operating point of the turbocharger 111 into a desired range.

Said fresh gas 103 passes to the catalytic converter 114, and passes through the catalytic converter 114. This results in a lean exhaust-gas mixture, and the catalytic converter no longer operates in its predefined optimum conversion window.

If certain boundary conditions or states of the catalytic converter exist during the scavenging operation, it is nevertheless possible for emissions to be adequately reduced, in particular for the nitrogen oxide emissions to be reduced.

Figure 2:
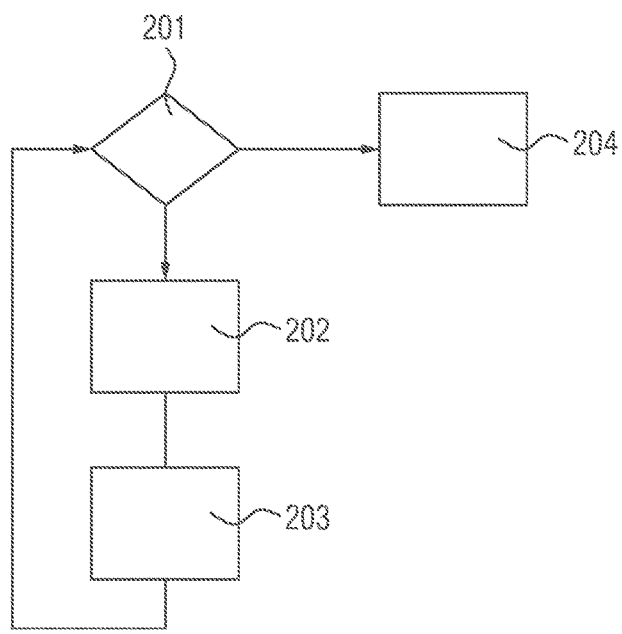
FIG. 2 shows a flow diagram of an embodiment of a method for operating a combustion machine.

This will be discussed in more detail below on the basis of the flow diagram illustrated in FIG. 2.

In particular, the combustion machine 100 has an apparatus 120 (FIG. 1) which is designed to carry out the method. For this purpose, the apparatus 120 is for example connected to the inlet valve 107 and/or to the outlet valve 108 in order to open and/or close these. Furthermore, in exemplary embodiments, the apparatus 120 is coupled to the catalytic converter 114 in order to measure or model at least one value of at least one state of the catalytic converter 114.

In a method step 201, it is checked whether a termination condition for the scavenging-over is present. For this purpose, at least one value of a state of the catalytic converter is determined and compared with a predefined value for the state. For example, an actual value of the temperature gradient of the catalytic converter is compared with a predefined value for the temperature gradient. Alternatively or in addition, an actual value of an absolute temperature of the catalytic converter 114 is compared with a predefined value for the absolute temperature. Alternatively or in addition, an actual value of a quantity of hydrocarbons in the catalytic converter 114 is compared with a predefined value for the quantity of hydrocarbons. Alternatively or in addition, an actual value of an oxygen storage capacity of the catalytic converter 114 is compared with a predefined value for the oxygen capacity. Alternatively or in addition, an actual value of an operating age of the catalytic converter 114 is compared with a predefined value for the operating age.

The predefined values for the states may be predefined such that reliable operation of the catalytic converter 114 is ensured. The predefined reduction of emissions by the catalytic converter 114 is realized in the presence of the predefined values of the states. It is thus possible for actually present values, for example of the temperature or of the quantity of hydrocarbons in the catalytic converter 114, to be used for permitting reliable operation.

If all determined values of the states are lower than the respectively associated predefined values, the method proceeds to step 202. In step 202, at least one value of at least one state of the catalytic converter 114 is determined. The state or the states used in step 202 may, in part or entirely, be the same states as those taken into consideration in step 201. The states in step 201 and in step 202 may also differ entirely. For example, in step 202, a value of a temperature gradient of the catalytic converter 114 is determined. Alternatively or in addition, a value of an absolute temperature of the catalytic converter 114 is determined. Alternatively or in addition, a value of a quantity of hydrocarbons in the catalytic converter 114 is determined. Alternatively or in addition, a value of an oxygen storage capacity of the catalytic converter 114 is determined. Alternatively or in addition, an operating age of the catalytic converter 114 is determined.

In step 203, it is subsequently determined how much fresh gas 103 the catalytic converter 114 can presently cope with, at a maximum, in order to operate reliably and reduce the required quantity of pollutants. For this purpose, the maximum admissible scavenged-over quantity of fresh gas 103 is specified as a function of the value or of the values that have been determined in step 202. It is thus possible for the mass flow in the exhaust tract 105 during the scavenging operation to be increased as desired. The mass flow is however increased only to such an extent that the catalytic converter 114 continues to operate reliably.

If it is detected in step 201 that a termination condition is present, that is to say that at least one actual value of the states inspected in step 201 corresponds to or exceeds a predefined value, the maximum admissible scavenged-over quantity is, in method step 204, set to a second value. The second value is set to be so low that the catalytic converter 114 receives only such a quantity of fresh gas 103 that adequate pollutant emission can be realized.

By way of these teachings, it is possible to avoid a situation in which the exhaust gas 106 in the exhaust tract 105 has an excessively low fraction of hydrocarbons and nitrogen oxides can no longer be adequately reduced. The maximum admissible scavenged-over quantity is always limited such that nitrogen oxide emissions can be adequately reduced or an increase in nitrogen oxide emissions can be avoided.

The limit for the admissible scavenged-over quantity (also referred to as scavenged-over mass) is determined from the admissible values of the states of the catalytic converter 114, for example from the admissible exothermic energy in the catalytic converter 114. It is thus possible for the maximum admissible scavenged-over quantity to be calculated from the permitted values of the states, in particular from the permitted exothermic energy, in an operating point-dependent manner. For example, the maximum admissible scavenged-over quantity is implemented in a characteristic map-based manner by way of corresponding camshaft setpoint values. For example, the inlet valve and outlet valve are opened such that their opening time periods overlap. It is thus possible for fresh gas 103 to pass through the cylinder 104 into the exhaust tract 105 without undergoing a combustion stroke.

Owing to the determination of the value of the state of the catalytic converter 114 in the step 202, it is possible, depending on the state of the catalytic converter, for the scavenged-over quantity to be increased; in particular, said increase is possible for a short time. Said higher scavenged-over quantities may be realized with stoichiometric exhaust gas with a high temperature gradient, or with lean exhaust gas with the risk of deterioration of emissions as a result of a breakthrough through the catalytic converter 114. The breakthrough is prevented because, in step 201, monitoring is performed to ensure that no termination condition is infringed. In the case of at least one of the predefined termination conditions being satisfied, the maximum admissible scavenged-over quantity is reduced, and is subsequently regulated for example by way of the temperature in the catalytic converter 114.

In some embodiments, the values of the maximum admissible scavenged-over quantity are specified as direct setpoint values. In further embodiments, the values of the maximum admissible scavenged-over quantity are specified as limitations and represent the upper limit of a range. A mixture is also possible, such that the values are, in part, specified as direct setpoint values and are, in part, specified as limitations.

In some embodiments, the values of the states of the catalytic converter, for example the temperature in the catalytic converter 114, are measured by way of sensors. In further embodiments, the values are modeled. A mixture is also possible, such that the values are, in part, measured by way of sensors and are, in part, modeled.

By way of these teachings, it is possible for the scavenged-over quantity to be optimized in a manner dependent on a desired mass flow and desired operation of the catalytic converter. The scavenged-over quantity is actively regulated.

LIST OF REFERENCE DESIGNATIONS

100 Combustion machine
101 Internal combustion engine
102 Fresh-gas tract
103 Fresh gas
104 Cylinder
105 Exhaust tract
106 Exhaust gas
107 Inlet valve
108 Outlet valve
109 Catalytic converter
111 Supercharging unit
112 Turbine
113 Compressor
114 Catalytic converter
120 Apparatus
201-204 Method steps

The invention claimed is:

1. A method for operating an internal combustion engine having a fresh-gas tract for the supply of fresh gas to a cylinder, and an exhaust tract for the discharge of exhaust gas, the method comprising:
determining a value of a first operating condition of a catalytic converter arranged in the exhaust tract;
determining a value of a second operating condition of the catalytic converter;
calculating, as a function of the determined value of the first operating condition, a first value for a maximum admissible scavenged-over quantity of fresh gas into the exhaust tract during scavenging operation;
setting the maximum admissible scavenged-over quantity to a second value lower than the first value if the value of the second operating condition reaches a predefined value; and
controlling a quantity of fresh gas introduced into the exhaust tract based on the maximum admissible scavenged-over quantity as set.

2. The method as claimed in claim 1, wherein determining the value of the first operating condition of the catalytic converter comprises modelling the value of the first operating condition.

3. The method as claimed in claim 1, wherein the first operating condition of the catalytic converter comprises a temperature gradient of the catalytic converter.

4. The method as claimed in claim 1, wherein determining a value of a second operating condition of the catalytic converter comprises comparing an actual value of a temperature gradient of the catalytic converter with a predefined value for the temperature gradient.

5. The method as claimed in claim 1, further comprising:
determining an opening time period for an inlet valve disposed in the fresh-gas tract and controlling the supply of the fresh gas to the cylinder;
determining an opening time period for an outlet valve disposed in the exhaust tract and controlling the discharge of the exhaust gas from the cylinder; and
determining an overlap period, in which the two opening time periods at least partially overlap, as a function of the maximum admissible scavenged-over quantity.

6. The method as claimed in claim 1, further comprising regulating the scavenged-over quantity as a function of a temperature of the catalytic converter if the value of the second operating condition reaches a predefined value.

7. The method as claimed in claim 1, wherein the first operating condition of the catalytic converter comprises an absolute temperature of the catalytic converter.

8. The method as claimed in claim 1, wherein the first operating condition of the catalytic converter comprises a quantity of hydrocarbons in the catalytic converter.

9. The method as claimed in claim 1, wherein the first operating condition of the catalytic converter comprises an oxygen storage capacity of the catalytic converter.

10. The method as claimed in claim 1, wherein the first operating condition of the catalytic converter comprises an operating age of the catalytic converter.

11. The method as claimed in claim 1, wherein determining a value of a second operating condition of the catalytic converter comprises comparing an actual value of an absolute temperature of the catalytic converter with a predefined value for the absolute temperature.

12. The method as claimed in claim 1, wherein determining a value of a second operating condition of the catalytic converter comprises comparing an actual value of a quantity of hydrocarbons in the catalytic converter with a predefined value for the quantity of hydrocarbons.

13. The method as claimed in claim 1, wherein determining a value of a second operating condition of the catalytic converter comprises comparing an actual value of an oxygen storage capacity of the catalytic converter with a predefined value for oxygen storage capacity.

14. The method as claimed in claim 1, wherein determining a value of a second operating condition of the catalytic converter comprises comparing an actual value of an operating age of the catalytic converter with a predefined value for the operating age.

15. An internal combustion engine comprising:
a combustion chamber;
a fresh-gas tract delivering fresh gas to the combustion chamber;
an exhaust tract for exhaust gas discharged from the combustion chamber;
an inlet valve for controlling the supply of the fresh gas disposed in the fresh-gas tract;
an outlet valve for controlling the discharge of the exhaust gas disposed in the exhaust tract; and
a processor configured to:
determine an opening time period for the inlet valve;
determine an opening time period for the outlet valve; and
determine an overlap period when both the inlet valve and the outlet valve are open based at least in part on a maximum admissible scavenged-over quantity; and
control the inlet valve and the outlet valve based on the determined time periods and the determined overlap period.

* * * * *